(12) United States Patent
Wu

(10) Patent No.: US 11,385,525 B1
(45) Date of Patent: Jul. 12, 2022

(54) SHIELDING STRUCTURE AND CAMERA

(71) Applicant: SHENZHEN XINZENGCAI CREATIVE ELECTRONICS CO., LTD., Shenzhen (CN)

(72) Inventor: Jingshui Wu, Shenzhen (CN)

(73) Assignee: SHENZHEN XINZENGCAI CREATIVE ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/458,595

(22) Filed: Aug. 27, 2021

(30) Foreign Application Priority Data

Jun. 9, 2021 (CN) .......................... 202121291829.3

(51) Int. Cl.
G03B 11/04 (2021.01)
(52) U.S. Cl.
CPC .................................. G03B 11/045 (2013.01)
(58) Field of Classification Search
CPC .............................. G02B 23/16; G03B 11/043
See application file for complete search history.

(56) References Cited

U.S. PATENT DOCUMENTS

| 8,837,030 | B2 | 9/2014 | Sakurai | |
| 10,481,469 | B2 | 11/2019 | Chen et al. | |
| 10,887,763 | B2 | 1/2021 | Yang et al. | |
| 2007/0274709 | A1* | 11/2007 | Ho | G03B 17/00 396/448 |
| 2010/0135650 | A1* | 6/2010 | Gao | G03B 17/00 396/448 |

* cited by examiner

Primary Examiner — Noam Reisner

(57) ABSTRACT

A shielding structure includes a camera base, a shielding member, and an operating member. The camera base is provided with a lens module and a guiding rail. One end of the shielding member is provided with a shielding part, the other end of the shielding member is provided with a connecting part, and a pivot point arranged between the connecting part and the shielding part. The operating member is connected to the connecting part and configured to slide along the guiding rail. Sliding of the operating member along the guiding rail drives the connecting part of the shielding member to move so as to bring the shielding member to rotate around the pivot point.

12 Claims, 12 Drawing Sheets

SHIELDING STRUCTURE AND CAMERA

CROSS-REFERENCE TO RELATED APPLICATIONS

This application claims priority to Chinese Patent Application No. 202121291829.3, filed on Jun. 9, 2021, the contents of which are incorporated by reference herein.

FIELD

The subject matter herein generally relates to cameras, and particularly relates to a shielding structure and a camera including the shielding structure.

BACKGROUND

With development of high-speed Internet technology and 5G technology, video communication has been rapidly developed in human production and life. However, with rapid development of video communication, there are many problems on privacy disclosure. In order to solve the problem of video privacy leakage, the design of camera anti-privacy function can be paid attention to in the products. At present, most of the manufacturers on the market basically use the straight track way, to achieve the straight motion of the shield piece, to block the camera lens. However, due to the long motion travel of the shielding piece of the above structure, it takes up a large space, so it is difficult to realize the miniaturization design of the camera, and it is difficult to realize the diversified design of the camera appearance.

SUMMARY

The present disclosure provides a shielding structure which can resolve the above-mentioned problems.

An embodiment of the present disclosure provides a shielding structure. The shielding structure includes a camera base, a shielding member, an operating member, and a cover. The camera base is provided with a lens module and a guiding rail. One end of the shielding member is provided with a shielding part, the other end of the shielding member is provided with a connecting part, and a pivot point arranged between the connecting part and the shielding part. The operating member is connected to the connecting part and configured to slide along the guiding rail. Sliding of the operating member along the guiding rail drives the connecting part of the shielding member to move so as to bring the shielding member to rotate around the pivot point. The cover defines a lens through hole corresponding to the lens module and an operating slot corresponding to the operating member. When the cover is connected to the camera base, the cover together with the camera base forms a receiving space for receiving the shielding member and the operating member, and the operating member extends out of the cover through the operating slot, the lens through hole and the operating slot are provided on a same surface of the cover.

In at least one embodiment, the operating member is provided with an accommodating space, the connecting part of the shielding member is provided with a convex shaft configured to be received in the accommodating space to achieve a connection between the operating member and the connecting part of the shielding member.

In at least one embodiment, the guiding rail is an arc-shaped groove, the operating member is provided with an arc-shaped sliding part configured to be received in the arc-shaped sliding groove.

In at least one embodiment, the accommodating space is a slot extending away from the arc-shaped sliding part, the convex shaft is configured to be received in the slot.

In at least one embodiment, an end of the slot away from the arc-shaped sliding part is open.

In at least one embodiment, the guiding rail is straight, the operating member is provided with a straight rack, the connecting part of the shielding member is provided with a sectorial rack configured to mesh with the straight rack.

In at least one embodiment, the guiding rail is a straight groove, the operating member is provided with a straight sliding part configured to be received in the straight groove.

In at least one embodiment, the camera base is provided with a center shaft, the pivot point of the shielding member defines a shaft hole configured to allow the center shaft to pass therethrough, so as to achieve a pivotable connection between the shielding member and the camera base.

In at least one embodiment, the guide rail is arranged in the receiving space and is defined on a side of the camera base corresponding to the cover.

In at least one embodiment, the cover defines a mounting hole, when the cover is connected to the camera base, the center shaft partially extends into the mounting hole.

An embodiment of the present disclosure provides a camera including the shielding structure.

The shielding structure and the camera including the shielding structure provided by the present disclosure allows a user to push the operating member to slide along the guiding rail so as to drive the shielding member to rotate around the pivot point. Therefore, the shielding member can be restrained to move in a sector-shaped area. When the user does not need to use the camera, the shielding member can be rotated to a closed state where the shielding part of the shielding member covers the lens module of the camera so as to protect user's privacy from leakage. When the user wants to use the camera, the shielding member can be rotated to an open state where the shielding part of the shielding member moves away from the lens module and does not cover the lens module of the camera, so that the user can use the camera normally. As mentioned above, the shielding member rotatably connected to the camera base so as to restrain movement range of the shielding part of the shielding member. The movement stroke of the shielding part of the shielding member is effectively reduced, and space occupied by the shielding member is thus reduced, which is beneficial for miniaturization of the camera. Furthermore, such arrangement is convenient for diversity design of appearance of the camera, is simple in structure and is reasonable in design.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
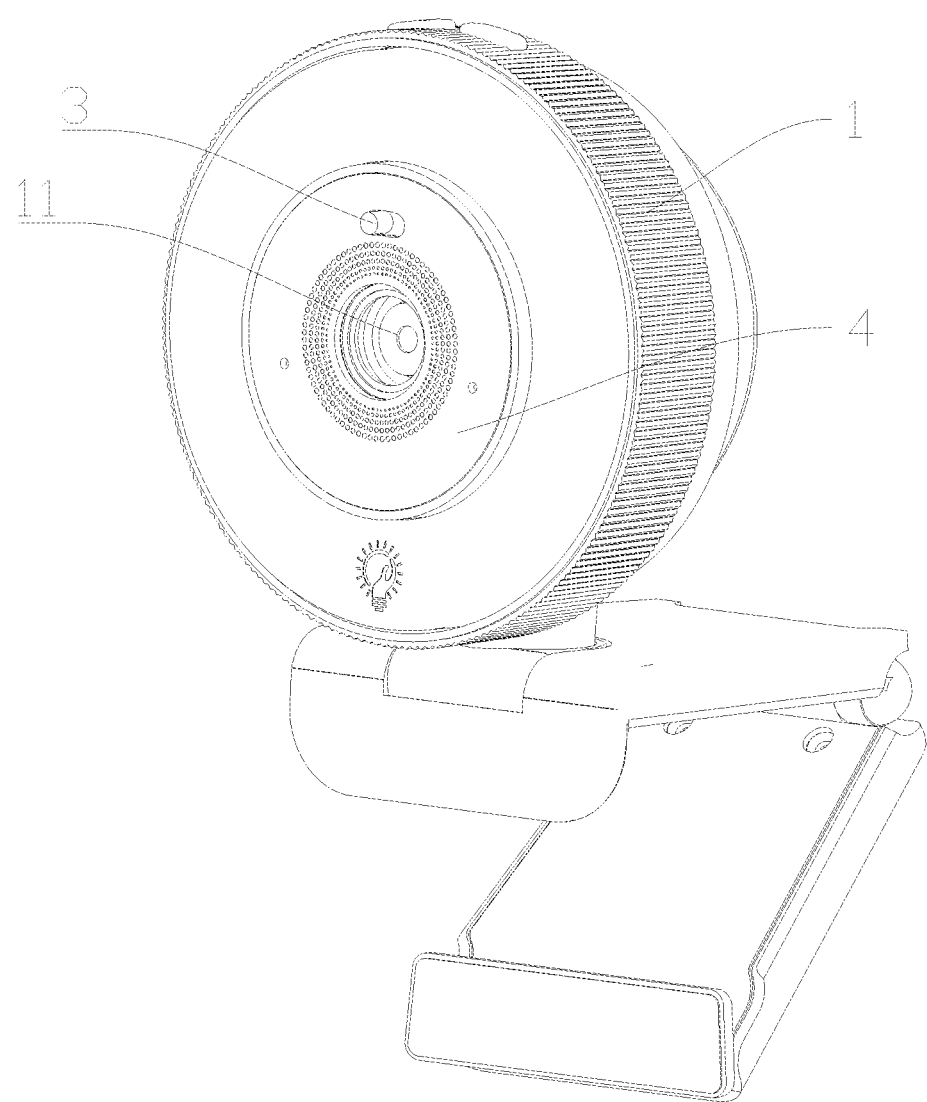
FIG. 1 is a schematic view of a camera with a shielding member in an open state where a lens is not sheltered by a shielding member in according to a first embodiment of the present disclosure.
Figure 2:
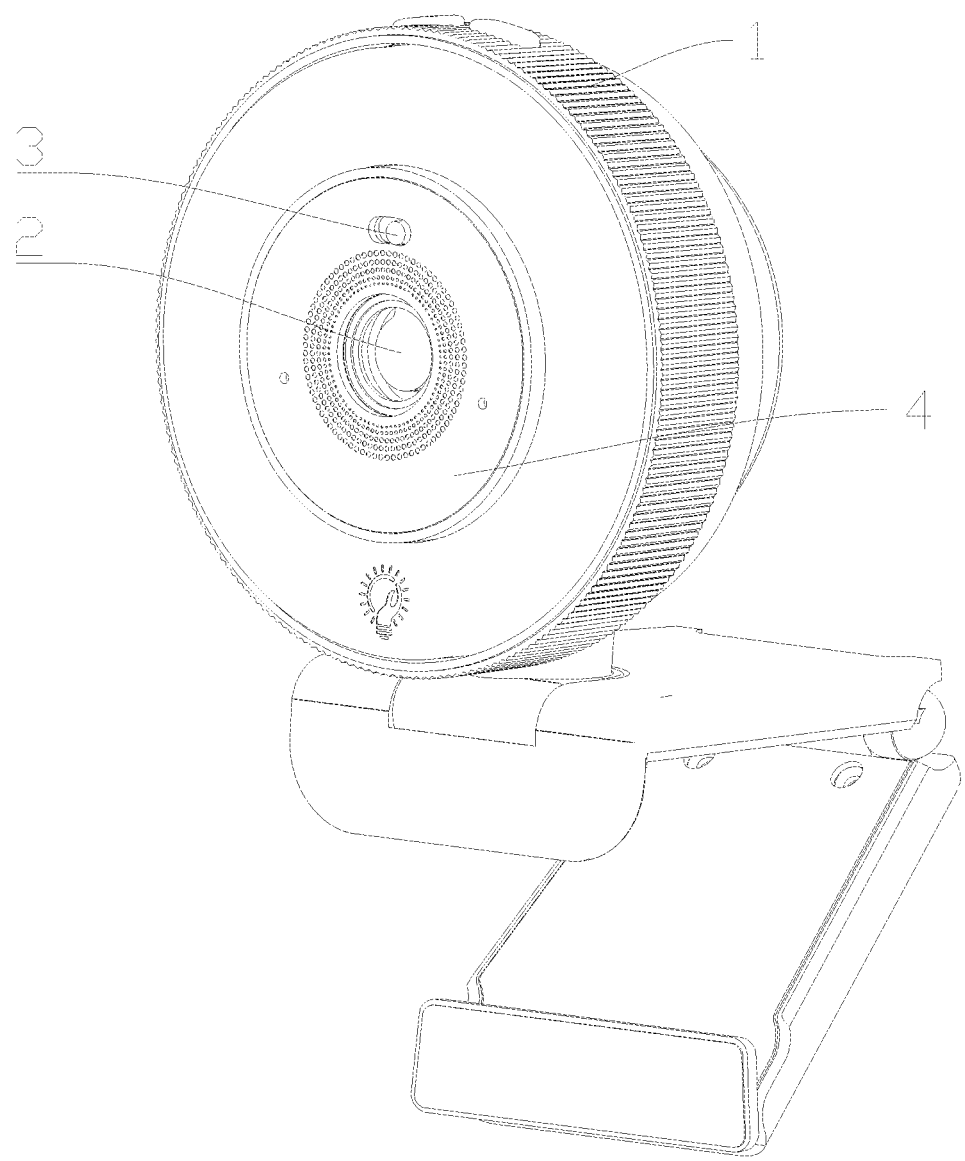
FIG. 2 is a schematic view of the camera of FIG. 1 with the shielding member in a closed state where a lens is shielded by the shielding member according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Referring to FIGS. 1-12, an embodiment of the present disclosure provides a camera including a shielding structure, the shielding structure includes a camera base 1, a shielding member 2, and an operating member 3. The camera base 1 is provided with a lens module 11. One end of the shielding member 2 is provided with a shielding part 21 configured to shield the lens module 11, and the other end of the shielding member 2 is provided with a connecting part 22 configured to connecting the camera base 1. A pivot point 23 is arranged between the shielding part 21 and the connecting part 22. The shielding member 2 is rotatably connected to the camera base 1 around the rotating the pivot point 23. A guiding rail 12 is arranged on the camera base 1. The operating member 3 is connected to the connecting part 22 of the shielding member 2 and slidably connected to the guiding rail 12. When the operating member 3 is pushed to slide along the guiding rail 12, the operating member 3 brings the connecting part 22 of the shielding member 2 to move, so that the shielding member 2 can rotate around the pivot point 23.

Through such arrangement, when in use, the operating member 3 is pushed to slide along the guiding rail to bring the connecting part 22 to move, so that the shielding member 2 rotates around the pivot point 23 to make the shielding part 21 to rotate in a sector-shaped area. When a user does not want to use the camera, the shielding part 21 of the shielding member 2 can be rotated to shield the lens module 11 of the camera. At this time, the shielding member 2 is in a closed state, which can protect user's privacy from leakage. When the user wants to use the camera, the shielding part 21 of the shielding member 2 can be rotated to be away from the lens module 11 to expose the lens module 11. At this time, the shielding member 2 is in an open state, which allows the user to use the camera normally. In conclusion, the shielding member 2 is pivotably connected to the camera base 1 and the operating member 3 is slidably connected to the guiding rail 12, which can restrain movement of the shielding member 2 in the sector-shaped area (similar to swing structure of a clock). Therefore, movement stroke of the shielding part of the shielding member is effectively reduced, and space occupied by the shielding member of the present disclosure is decreased, which is beneficial to miniaturization of the camera. Furthermore, such arrangement is convenient for diversity design of appearance of the camera, is simple in structure and is reasonable in design.

Figure 5:
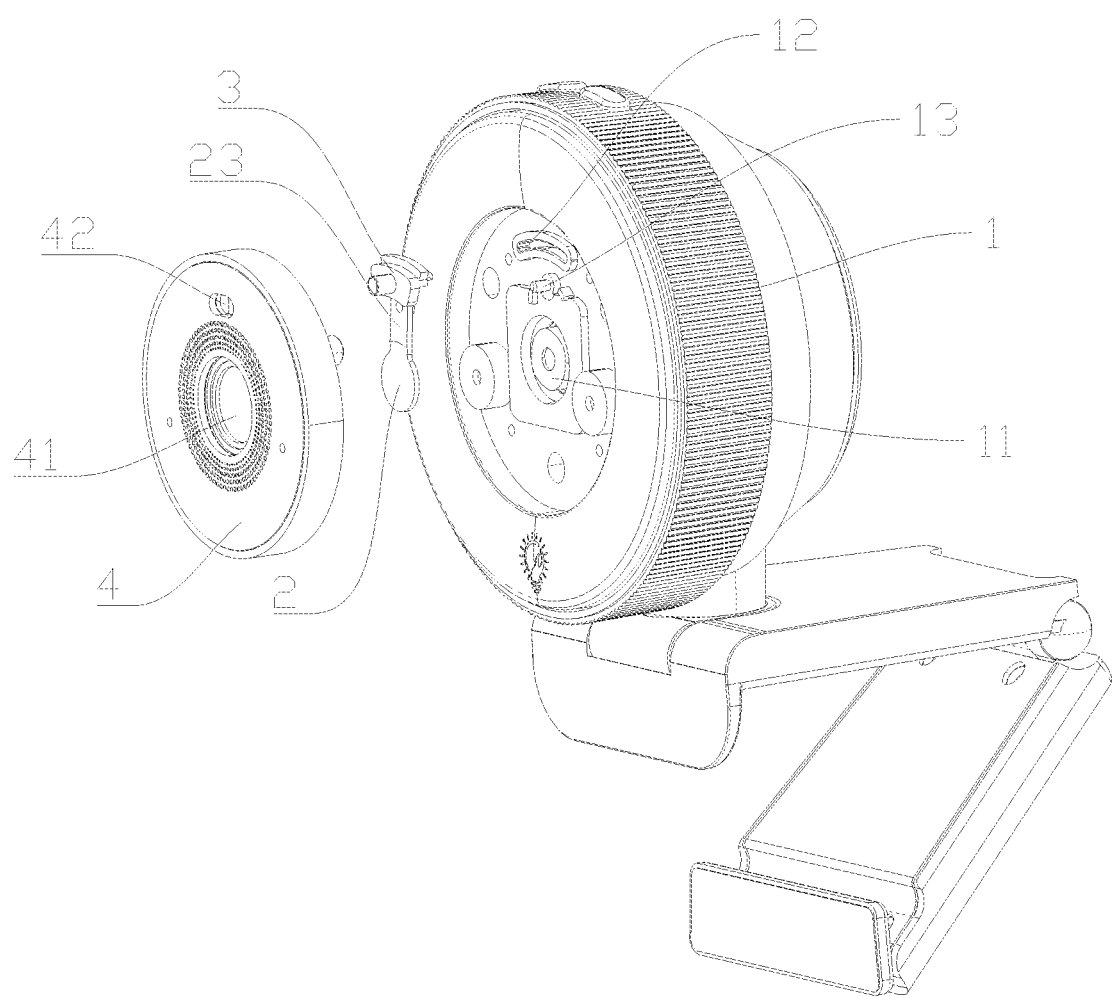
FIG. 5 is an exploded view of the camera of FIG. 1 in according to the first embodiment of the present disclosure.
Figure 6:
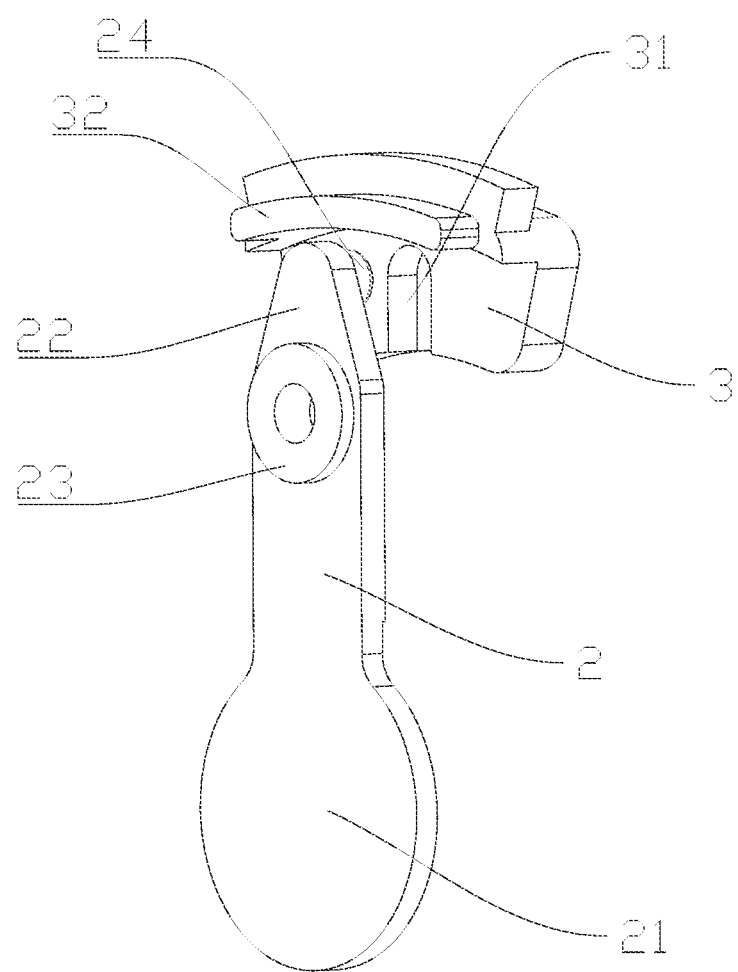
FIG. 6 is a schematic view of the shielding member and an operating member in according to the first embodiment of the present disclosure.
Figure 7:
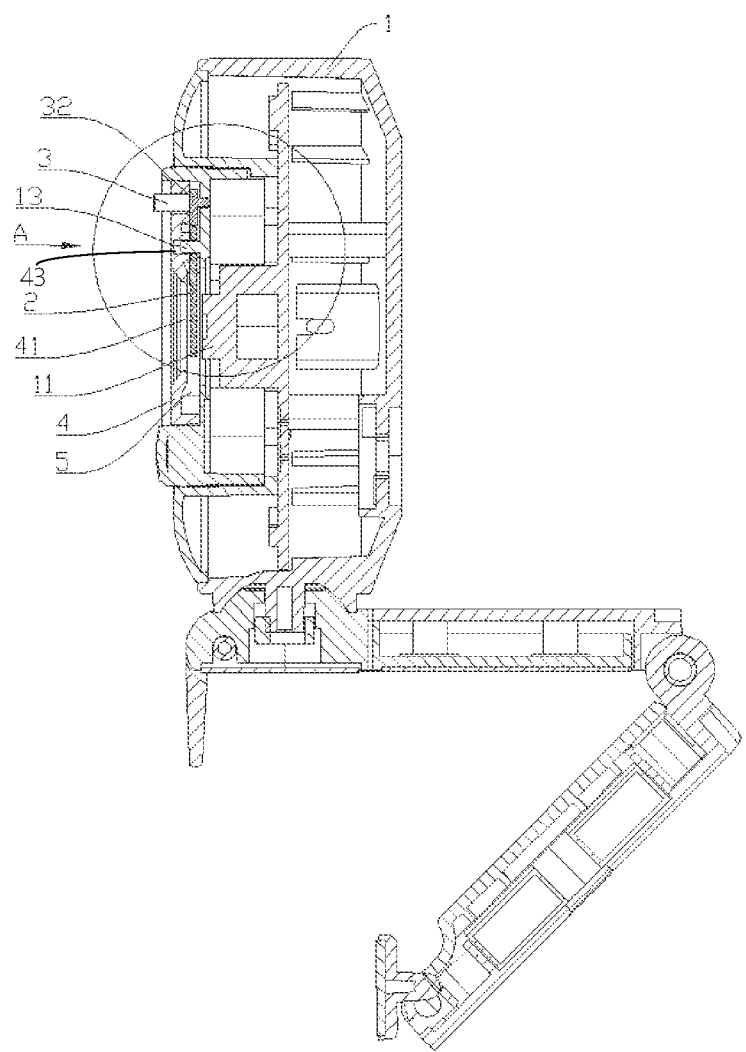
FIG. 7 is a cross-sectional view of the camera in according to the first embodiment of the present disclosure.
Figure 8:
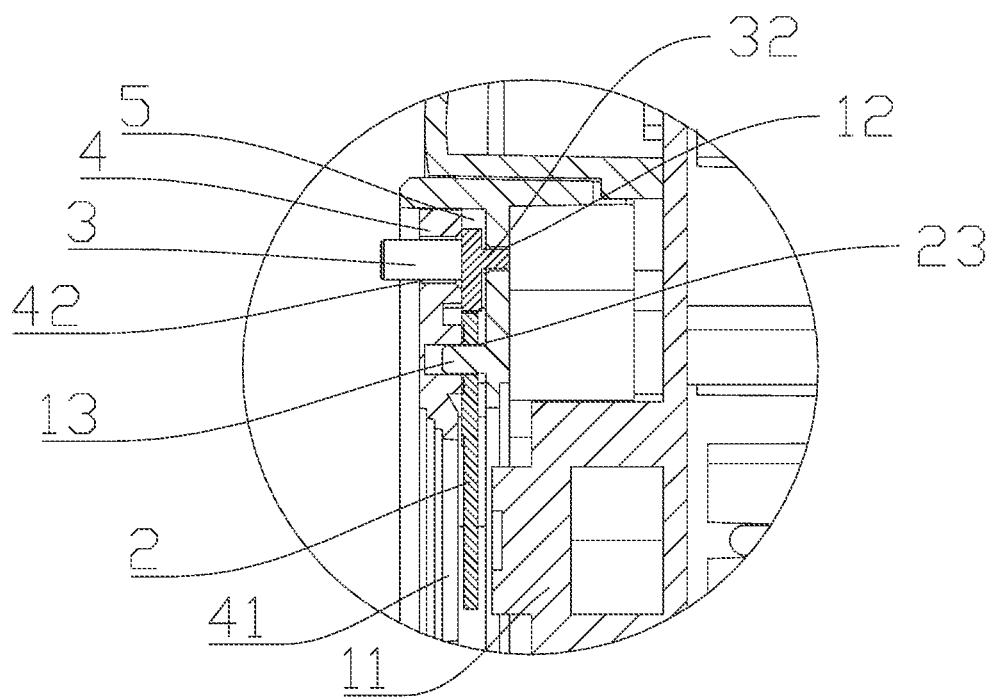
FIG. 8 is an enlarged view of a portion A shown in FIG. 7.
Figure 9:
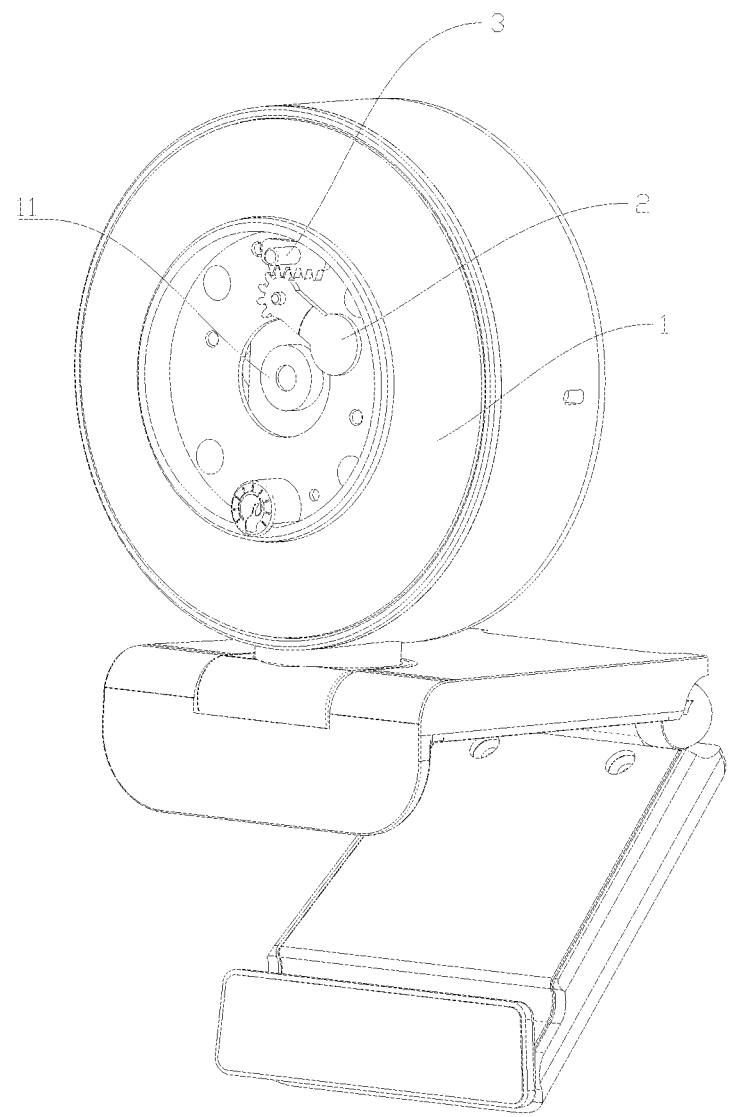
FIG. 9 is a schematic view of a camera in the open state in according to a second embodiment of the present disclosure, with a cover being removed.
Figure 10:
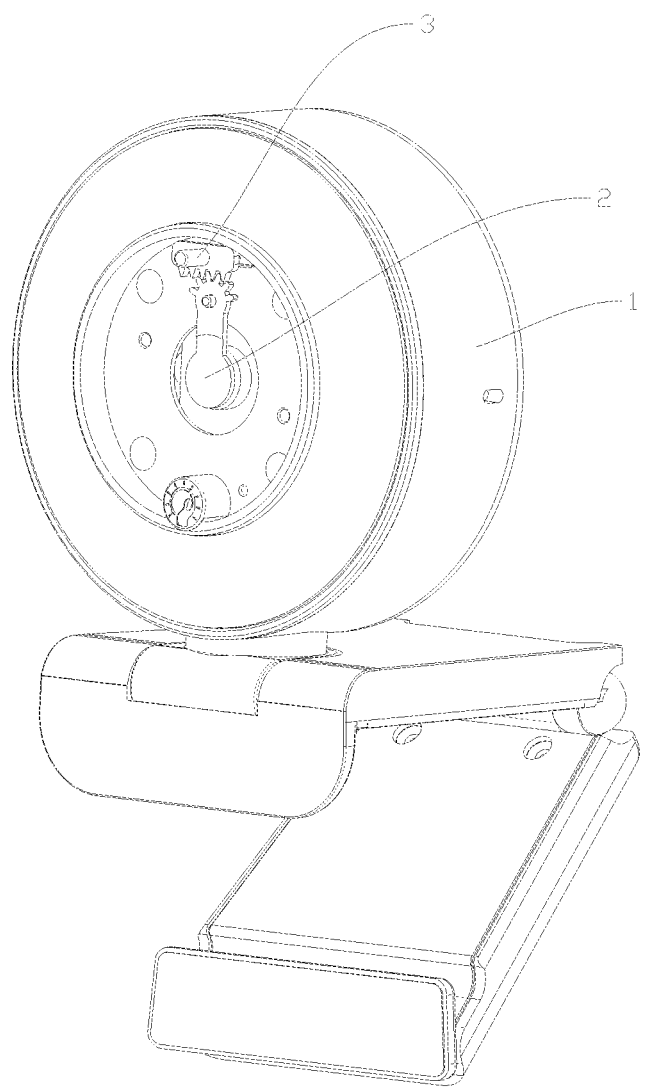
FIG. 10 is schematic view of a camera in the close state in according to the second embodiment of the present disclosure, with the cover being removed.

In a preferred embodiment of the present disclosure, referring to FIGS. 1-8, the operating member 3 is provided with an accommodating space 31 (FIG. 6). Accordingly, the connecting part 22 of the shielding member 2 is provided with a convex shaft 25 which is configured to be capable of being received in the accommodating space 31 to connect the connecting part 22 of the shielding member 2 to the operating member 3. Such arrangement is simple in structure, and is easy to assemble/disassemble.

Figure 3:
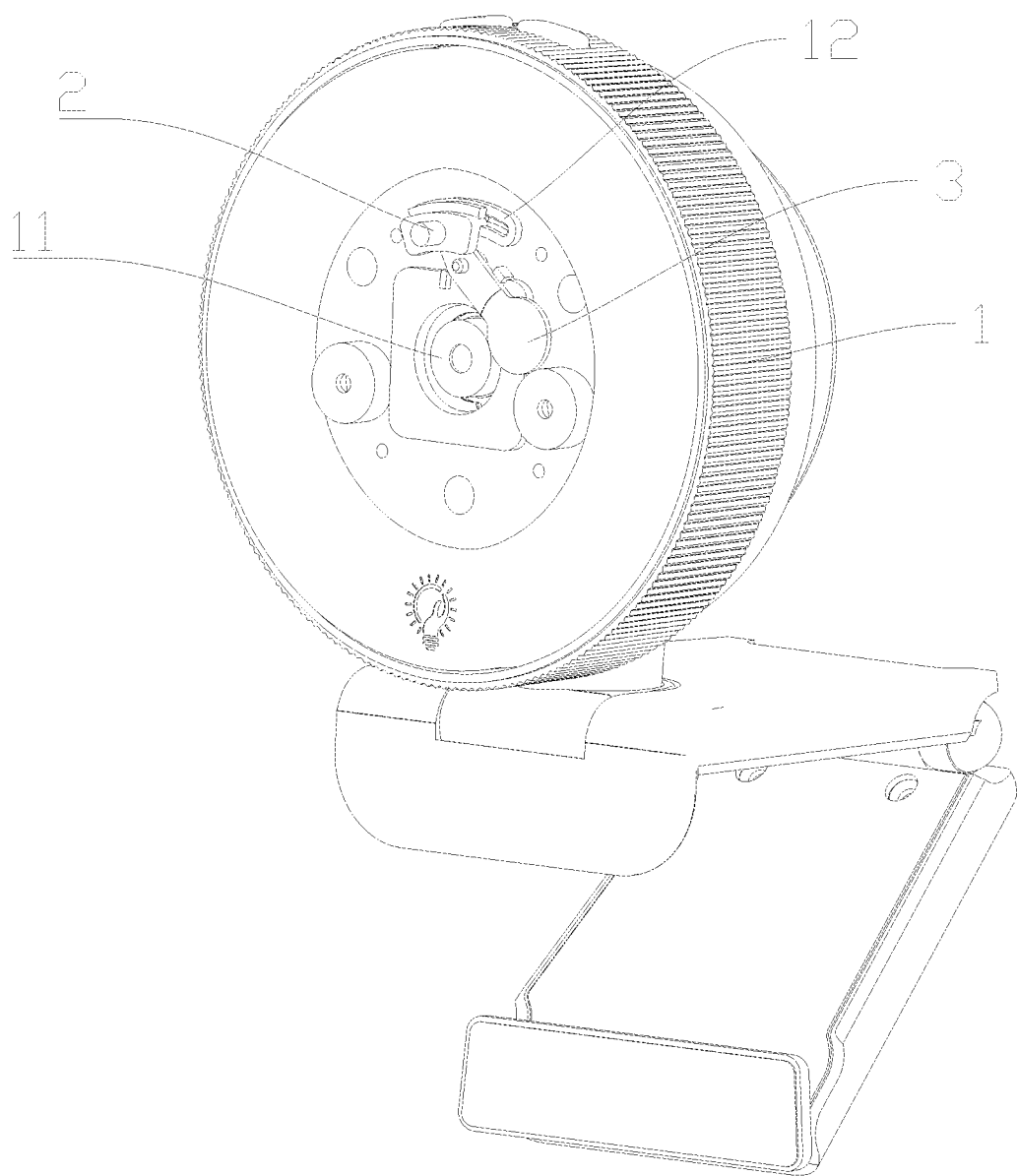
FIG. 3 is a schematic view of the camera of FIG. 1 with a cover being removed.
Figure 4:
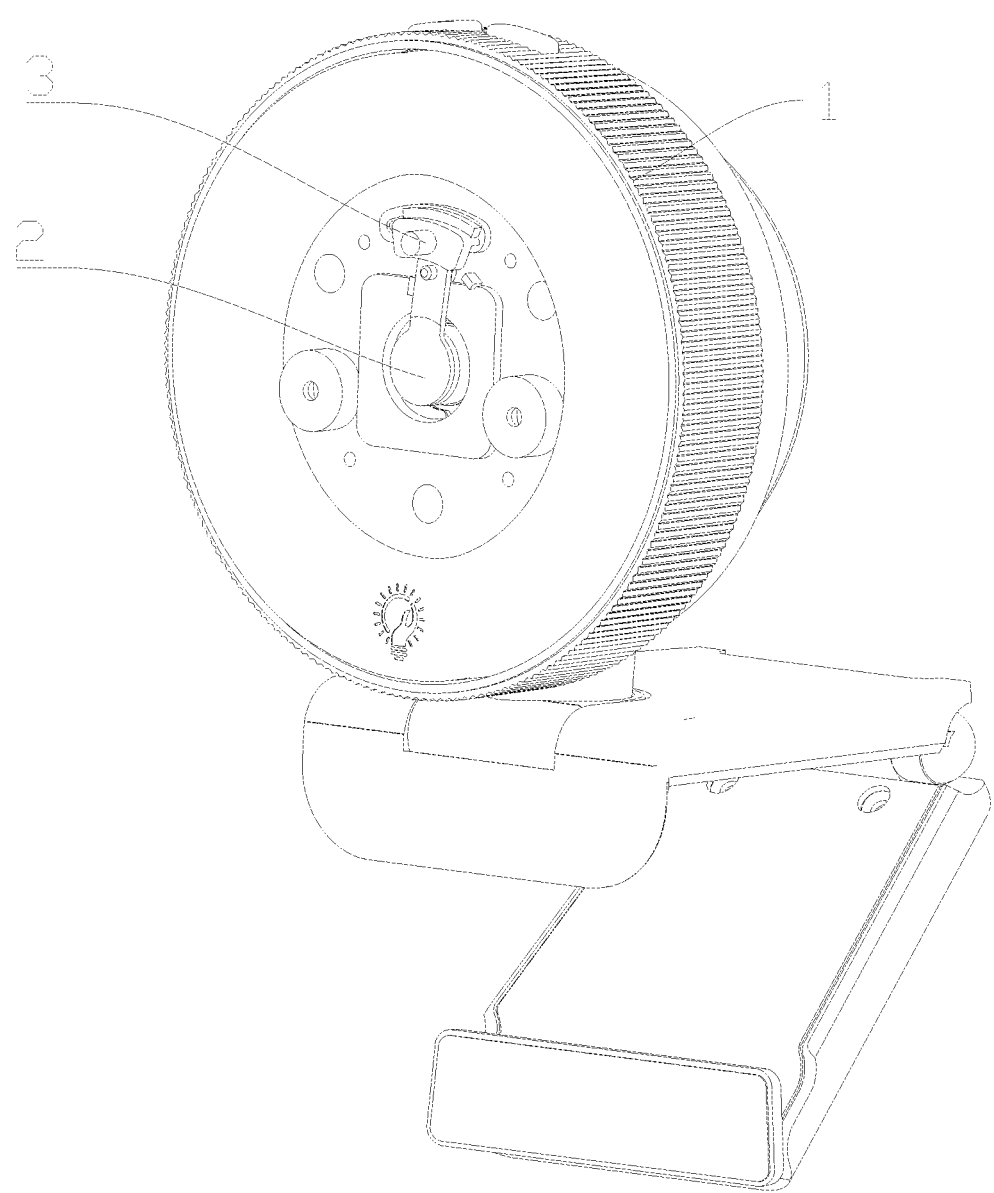
FIG. 4 is a schematic view of the camera of FIG. 2 with a cover being removed.

In at least one embodiment, the guiding rail 12 is an arc-shaped groove (referring to FIGS. 3 and 5). Accordingly, the operating member 3 is provided with an arc-shaped sliding part 32 (referring to FIG. 6). The arc-shaped sliding part 32 of the operating member 3 is configured to be received in the arc-shaped groove to make sliding of the operating member 3 more stable and reliable.

In at least one embodiment, the accommodating space 31 of the operating member 3 is a slot extending away from the arc-shaped sliding part 32, and the convex shaft 25 is received in the slot of the operating member 3. In detail, the slot extending towards an arc center of the arc-shaped sliding part 32. Therefore, when the operating member 3 slides along the arc-shaped groove, sidewalls surrounding the slot pushes the convex shaft 25 to make the shielding member 2 to rotate around the pivot point 23. In at least one embodiment, the slot is configured to allow the convex shaft to move inside the slot, so that a center of the arc-shaped groove is different from a rotating center of the shielding member 2. Such arrangement is more reasonable and universal. In other embodiments, the accommodating space 31 can be a pivot hole or in other suitable structure.

In at least one embodiment, one end of the slot away from the arc-shaped sliding part 32 is open, through which the convex shaft 25 of the operating member 3 can go into the slot. Such structure is simple and easy to assemble/disassemble.

Figure 11:
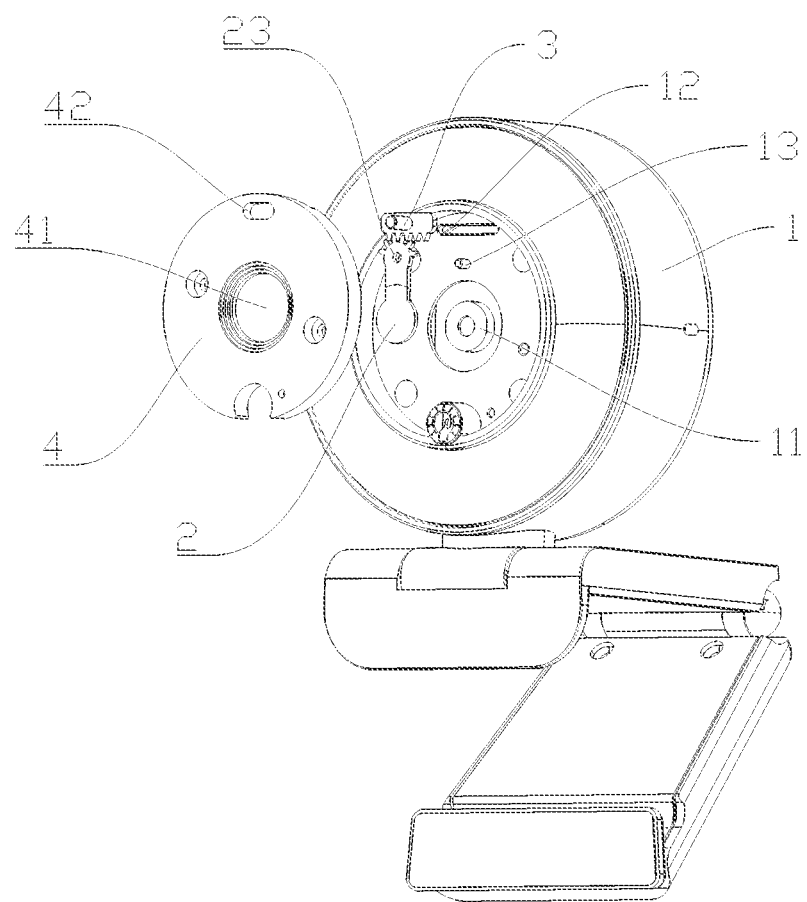
FIG. 11 is an exploded view of the camera of FIG. 9.
Figure 12:
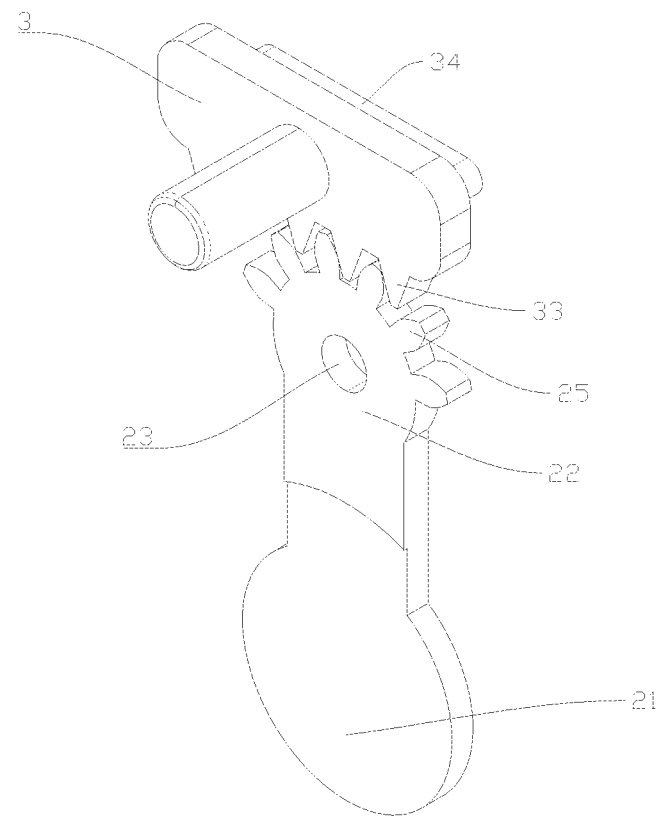
FIG. 12 is a schematic view of the shielding member and the operating member according to the second embodiment of the present disclosure.

In at least one embodiment, referring to FIGS. 9-12, the guiding rail 12 is a straight groove (referring to FIG. 11). The operating member 3 is provided with a straight rack 33, and the connecting part 22 of the shielding member 2 is provided with a sectorial rack 25 configured to mesh with the straight rack 33 (referring to FIG. 12).

Through such arrangement, the operating member 3 can be pushed to along the straight groove, and movement of the straight rack 33 can drive the sectorial rack 25 to move so as to bring the shielding member 2 to rotate around the pivot point 23. Such structure is simple and reliable. It should be understood that, in at least one embodiment, structures for connecting the operating member and the connecting part 22 of the shielding member 2 can be any other suitable structure which can make movement of the operating member 3 to drive the shielding member 2 to rotate around the pivot point 23.

In at least one embodiment, the camera base 1 is provided with a center shaft 13, and the pivot point 23 defines a shaft hole. The center shaft 13 is received in the shaft hole to make the shielding member 2 rotatably connected to the camera base 1. Such structure is simple and easy to assemble/disassemble.

Referring to FIG. 5, the shielding structure further includes a cover 4. The camera base 1 defines a center through hole 10 and the cover 4 can be mounted into the center through hole 10. Both the cover 4 and the center through hole 10 can be circular. The shielding member 2, the operating member 3 and the lens module 11 are exposed through the center through hole 10. That is, the shielding member 2, the operating member 3 and the lens module 11 are arranged corresponding to the cover 4. The cover 4 defines a lens through hole 41 and an operating slot 42. The lens through hole 41 and an operating slot 42 are provided on a same surface of the cover 4. The cover 4 can be detachably mounted onto the camera base 1 with the lens through hole 41 corresponding to the lens module 11. So that, the lens module 11 can be exposed through the lens through hole 41. Such structure is simple and reasonable. The cover 4 together with the camera base 1 forms a receiving space 5 for receiving the shielding member 2, the operating member 3 and the lens module 11. The operating member 3 extends out of the cover 4 through the operating slot 42. Such structure is simple and reasonable. Additionally, the cover 4 is further provided with mounting groove 43. When the cover 4 is connected to the camera base 1, the center shaft 13 partially extends into the mounting hole, which enhances stability of the camera (referring to FIG. 7).

The camera provided by the present disclosure includes the shielding structure, which allows a user to push the operating member to slide along the guiding rail so as to drive the shielding member to rotate around the pivot point. Therefore, the shielding member can be restrained to move in a sector-shaped area. When the user does not need to use the camera, the shielding member can be rotated to a closed state where the shielding part of the shielding member covers the lens module 11 of the camera so as to protect user's privacy from leakage. When the user wants to use the camera, the shielding member can be rotated to an open state where the shielding part of the shielding member moves away from the lens module 11 and does not cover the lens module 11 of the camera, so that the user can use the camera normally. As mentioned above, the shielding member rotatably connected to the camera base so as to restrain movement range of the shielding part of the shielding member. The movement stroke of the shielding part of the shielding member is effectively reduced, and space occupied by the shielding member is thus reduced, which is beneficial for miniaturization of the camera. Furthermore, such arrangement is convenient for diversity design of appearance of the camera, is simple in structure and is reasonable in design.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A shielding structure, comprising:
   a camera base, provided with a lens module and a guiding rail;
   a shielding member, one end of the shielding member being provided with a shielding part, the other end of the shielding member being provided with a connecting part, and a pivot point arranged between the connecting part and the shielding part;
   an operating member, connected to the connecting part and configured to slide along the guiding rail, wherein sliding of the operating member along the guiding rail drives the connecting part of the shielding member to move so as to bring the shielding member to rotate around the pivot point; and
   a cover, wherein the cover defines a lens through hole corresponding to the lens module and an operating slot corresponding to the operating member, when the cover is connected to the camera base, the cover together with the camera base forms a receiving space for receiving the shielding member and the operating member, and the operating member extends out of the cover through the operating slot, the lens through hole and the operating slot are provided on a same surface of the cover;
   wherein the operating member is provided with an accommodating space, the connecting part of the shielding member is provided with a convex shaft configured to be received in the accommodating space to achieve a connection between the operating member and the connecting part of the shielding member; and
   the guiding rail is an arc-shaped groove, the operating member is provided with an arc-shaped sliding part configured to be received in the arc-shaped sliding groove.

2. The shielding structure according to claim 1, wherein the accommodating space is a slot extending away from the arc-shaped sliding part, the convex shaft is configured to be received in the slot.

3. The shielding structure according to claim 2, wherein an end of the slot away from the arc-shaped sliding part is open.

4. The shielding structure according to claim 1, wherein the camera base is provided with a center shaft, the pivot point of the shielding member defines a shaft hole configured to allow the center shaft to pass therethrough, so as to achieve a pivotable connection between the shielding member and the camera base.

5. The shielding structure according to claim 1, wherein the guide rail is arranged in the receiving space and is defined on a side of the camera base corresponding to the cover.

6. The shielding structure according to claim 1, wherein the cover defines a mounting hole, when the cover is connected to the camera base, the center shaft partially extends into the mounting hole.

7. A camera, comprising a shielding structure, wherein the shielding structure comprises:
- a camera base, provided with a lens module and a guiding rail;
- a shielding member, one end of the shielding member being provided with a shielding part, the other end of the shielding member being provided with a connecting part, and a pivot point arranged between the connecting part and the shielding part;
- an operating member, connected to the connecting part and configured to slide along the guiding rail, wherein sliding of the operating member along the guiding rail drives the connecting part of the shielding member to move so as to bring the shielding member to rotate around the pivot point; and
- a cover, wherein the cover defines a lens through hole corresponding to the lens module and an operating slot corresponding to the operating member, when the cover is connected to the camera base, the cover together with the camera base forms a receiving space for receiving the shielding member and the operating member, and the operating member extends out of the cover through the operating slot, the lens through hole and the operating slot are provided on a same surface of the cover;
- wherein the operating member is provided with an accommodating space, the connecting part of the shielding member is provided with a convex shaft configured to be received in the accommodating space to achieve a connection between the operating member and the connecting part of the shielding member; and
- the guiding rail is an arc-shaped groove, the operating member is provided with an arc-shaped sliding part configured to be received in the arc-shaped sliding groove.

8. The camera according to claim 7, wherein the accommodating space is a slot extending away from the arc-shaped sliding part, the convex shaft is configured to be received in the slot.

9. The camera according to claim 8, wherein an end of the slot away from the arc-shaped sliding part is open.

10. The camera according to claim 7, wherein the camera base is provided with a center shaft, the pivot point of the shielding member defines a shaft hole configured to allow the center shaft to pass therethrough, so as to achieve a pivotable connection between the shielding member and the camera base.

11. The camera according to claim 7, wherein the guide rail is arranged in the receiving space and is defined on a side of the camera base corresponding to the cover.

12. The camera according to claim 7, wherein the cover defines a mounting hole, when the cover is connected to the camera base, the center shaft partially extends into the mounting hole.

* * * * *